United States Patent [19]
Brown

[11] 3,771,885
[45] Nov. 13, 1973

[54] NON-SLIP HANDLE TO BAIL RETAINING MEANS

[75] Inventor: Ralph L. Brown, North Canton, Ohio

[73] Assignee: The Hoover Company, North Canton, Ohio

[22] Filed: Oct. 6, 1972

[21] Appl. No.: 295,672

[52] U.S. Cl. .......................... 403/379, 15/DIG 10
[51] Int. Cl. ............................................... F16b 1/00
[58] Field of Search .................. 306/21, 28, 38, 39, 306/26, 1; 287/118, 23, 54 E, 119 R, 54 A, 56, 53 TK, 103 R; 285/197, 419; 16/114 R, 114 A

[56] References Cited
UNITED STATES PATENTS

| 698,098 | 4/1902 | Barnes et al. ................ 287/56 X |
| 3,113,795 | 12/1963 | Rogers ............................ 287/119 R |
| 1,907,153 | 5/1933 | Greider .................................. 306/1 |
| 1,530,045 | 3/1925 | Guy ..................................... 306/26 |

FOREIGN PATENTS OR APPLICATIONS

| 274 | 7/1889 | Switzerland ............................ 306/1 |

Primary Examiner—James R. Boler
Assistant Examiner—Conrad L. Berman
Attorney—Alfred G. Gross et al.

[57] ABSTRACT

A handle and bail arrangement for a floor care appliance or the like includes a sleeve portion on the bail into which the lower part of the handle extends. A bracket plate is nested in abutting engagement with this portion of the handle, with the sleeve and bracket plate having interengaging tabs and slots. Coincident apertures are formed in the bracket plate, handle part and sleeve for the reception of a bolt to hold the bracket plate, handle and bail in assembled relation. Another aperture is formed in the sleeve into which an additional tab mounted on the bracket plate engages. The bolt connection, thereby, primarily, prevents the handle and bail from vertical movement relative to one another, while the tabs and slots on the sleeve and bracket plate prevent the bail and handle from rotating relative to one another and the engagement of the additional tab on the bracket plate, with the additional aperture in the handle, prevents turning of the bail and handle relative to each other.

3 Claims, 6 Drawing Figures

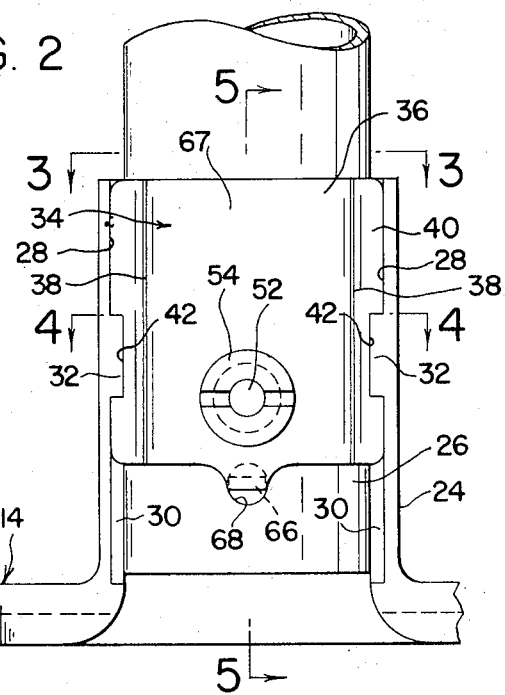
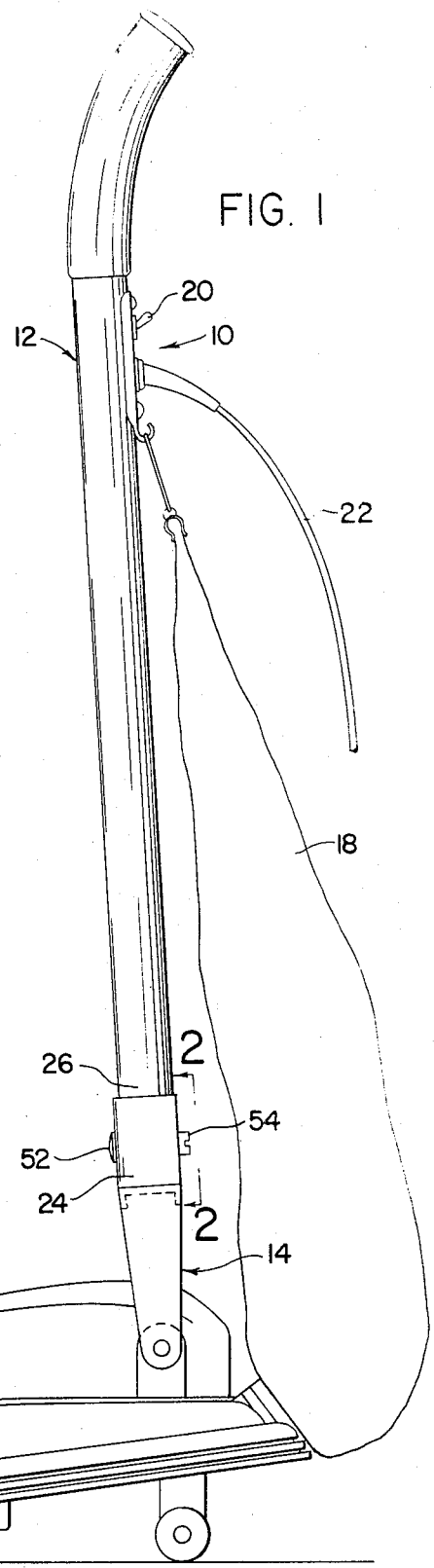
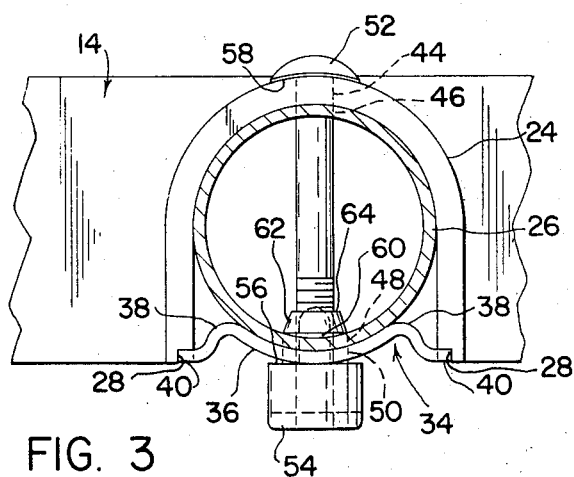
FIG. 1
FIG. 2
FIG. 3

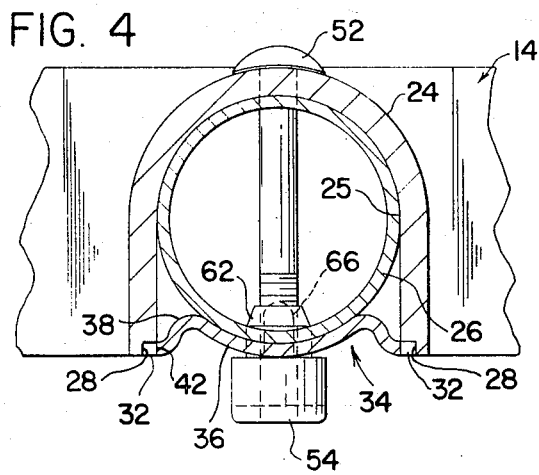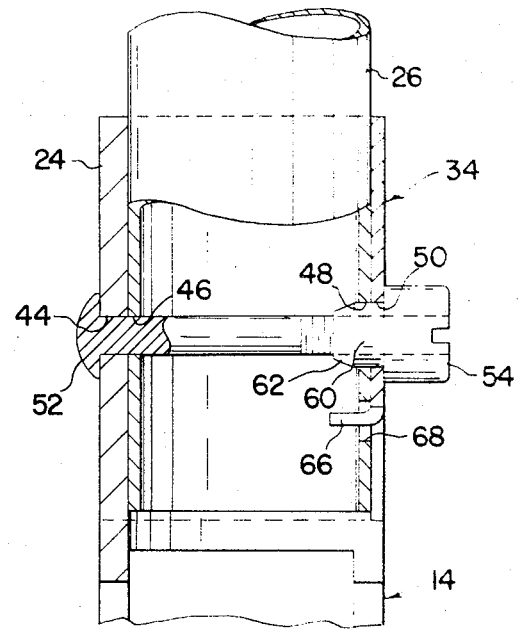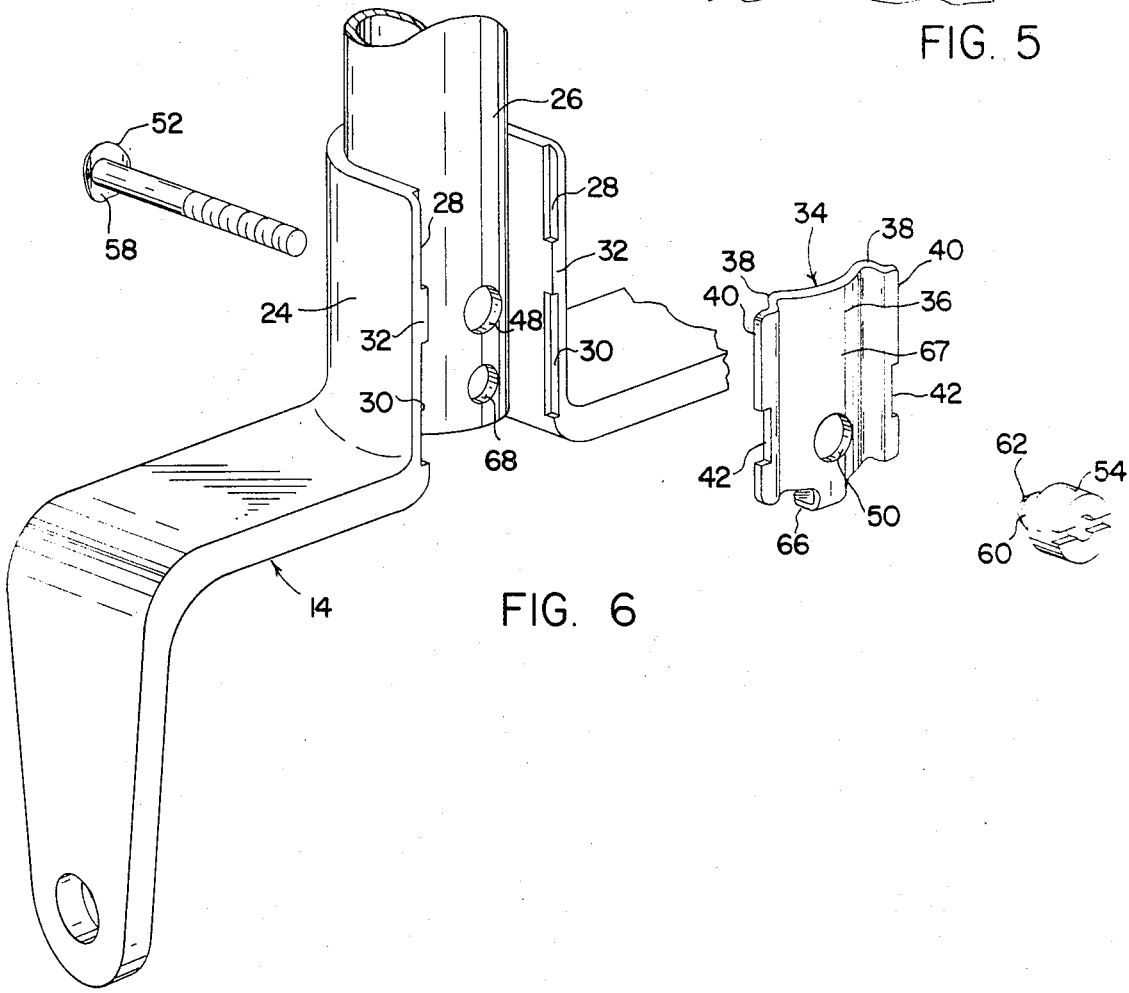

NON-SLIP HANDLE TO BAIL RETAINING MEANS

1. Field of the Invention

The invention relates to a connecting arrangement broadly and, more specifically, relates to a connecting arrangement between the bail and handle of a floor care appliance.

2. Description of the Prior Art

Although handle-to-bail connections for floor care appliances have been known for many years, the structural arrangements utilized have not provided a completely locked connection, positively preventing relative movement between the bail and handle under all the operating conditions to which the connection is subjected. For example: U.S. Pat. No. 110,325 discloses a broom handle connection utilizing handle-mounted bars that engaged in slots on a bail to prevent relative turning of the broomhead relative to the handle; U.S. Pat. No. 744,312 illustrates a two-part collar arrangement for a carpet sweeper held in engagement around the handle by a screw and by insertion of the bail members therein and U.S. Pat. No. 956,215 discloses a bail on a carpet sweeper with a right angled slot in which a pin on the handle fits so as to maintain the handle fixed vertically relative to the bail. Thus, none of the above bail and handle connections provide effectively and positively for limitation of turning, rotating and vertical movement of a bail relative to its handle; nor do any other bail and handle connections known to Applicant.

Accordingly, it would be advantageous to provide a bail and handle structural connection arrangement for a cleaning appliance or the like which would substantially eliminate relative vertical, rotating or turning movement between the bail and handle. It would be even more advantageous if such a structural connection was both inexpensive and yet effective so as to provide positive fixed mating of the parts involved.

SUMMARY OF THE INVENTION

In accordance with the principles of the instant invention, a handle and bail or the like are provided with interconnecting structure of an inexpensive nature that prevents rotating, turning and vertical movement therebetween. The bail includes an integral sleeve portion with an aperture extending therethrough. The handle and a bracket plate which provides, with the sleeve, a closed loop around the handle, include apertures which conform to the aperture in the bail when the bail, bracket plate and handle are assembled. A bolt means or the like is used for making this connection, which, when formed, limits relative vertical movement between the bail and handle. Another aperture formed in the handle receives a tab mounted on the bracket plate so as to limit turning movement of the handle relative to the bail. An additional pair of tabs of the bail sleeve engage open slots in the bracket plate to thereby prevent rotating of the handle relative to the bail, with the above bolt means maintaining the bail, bracket plate and handle in an assemblage. Thus, a securely mated configuration of relative simplicity if formed to eliminate user problems engendered by a loose or insecure floor care appliance handle.

BRIEF DESCRIPTION OF THE DRAWING

Reference may now be had to the appended drawings for a better understanding of the invention, both as to its organization and functioning, with the illustration being exemplary only and in which:

FIG. 1 is a side view in elevation of a floor care appliance in accordance with the principles of my invention;

FIG. 2 is a view in elevation of that portion of FIG. 1 with which the invention is concerned, taken on line 2—2 of FIG. 1;

FIG. 3 is a cross-sectional view of the invention taken on line 3—3 of FIG. 2;

FIG. 4 is also a cross-sectional view of the invention but taken on line 4—4 of FIG. 2;

FIG. 5 is an elevational view in cross section of the invention taken on line 5—5 of FIG. 2; and FIG. 6 is an exploded perspective rear view of the connecting structural arrangement of the instant invention.

DESCRIPTION OF THE PREFERRED EMBODIMENT

Referring now to FIG. 1 of the drawings, specifically, it can be seen that a floor care appliance 10, in the form of a cleaner or the like, includes a handle 12 connected to a bail 14 which, in turn, is pivoted to a cleaner housing 16. The cleaner housing, as is conventional, includes a motor, agitator brushes and the like (not shown) for the pick up of floor dirt that is stored in a cleaner bag 18 attached, conventionally, to the cleaner housing 16 and handle 12. An electric switch 20 is included to provide the energization of the cleaner through an electric cord 22 having, conveniently, a plug or the like (not shown) for connection to a wall receptacle or the like (also not shown). The structure in so far as related is well known in the art and is only delineated so as to furnish background and environment for the inventive features of the structural connection between the handle 12 and bail 14.

Referring now to FIGS. 2 – 6, bail 14 is seen as including a sleeve portion 24 which is integral therewith and C-shaped in plan view to provide a receiving and embracing means having a curvilinear surface 25, which closely conforms to the cylindrical periphery of a lower handle portion 26 for the vertical extent of this lower handle portion. Sleeve portion 24 also includes upper and lower reliefs 28, 28 and 30, 30, respectively, at the inner terminations of the legs of the C-shaped sleeve, with these reliefs being right angled in cross section so as to form therebetween a pair of tabs 32, 32. Each of the tabs 32, 32 extends generally both radially outwardly and also inwardly toward each other so as to form one half of an attachment means (to be described in greater detail below).

In order to cover and embrace that part of lower handle portion 26 left open and not embraced by the C-shaped sleeve portion 24, a bracket plate 34 is provided having a partially cylindrical or curvilinear middle surface or section 36 conforming in curvature to the cylindrical shape of handle portion 26 and closely abutting it in assembled position. Middle section 36 terminates at its opposite sides in reverse curve sections 38, 38 which merge into straight terminating sections 40, 40. The reverse curve sections 38, 38 are, of course, of sufficient extent to provide an offset of a depth so that each of the terminating sections 40, 40 mate in their respective upper and lower reliefs 28, 30.

In order to insure proper seating of each of the straight sections 40 in its upper and lower reliefs, and open groove 42 is provided intermediate the height of each terminating section 40 and extending from the front to back thereof, located and dimensioned to permit the insertion of a tab 32 therein. Then, because of the close interfitting of the tabs 32, 32 with th open grooves 42, 42 and the dimensioning of the reverse curve sections 38, 38 and the curvature of the middle section 36 of bracket plate 34, upon a proper compressive force being applied, the handle portion 26 is held in a closely nested relationship with a surface-to-surface abutment between it and the sleeve portion 24 of bail 14 and the middle section 36 of bracket plate 34.

So as to properly clampingly hold these three elements in an assemblage, the sleeve portion of bail 14 includes an aperture or bore 44 extending diametrically therethrough parallel to the terminating portions of the legs of the C shape of the sleeve portion 24. In assembled condition, coaxial with this aperture or bore and in confronting relation thereto is a bore or aperture 46 in lower handle portion 26. This bore extends through the cylindrical wall of the handle 12 and is in axial alignment with a second aperture or bore 48, situated diametrically opposite the bore or aperture 46 and extending through opposite portions of the cylindrical wall of lower handle portion 26. A similar bore or aperture 50 is provided in bracket plate 34, with the bore 50 axially aligned with the bores 44, 46 and 48 when the handle, bail and bracket plate are assembled.

An unobstructed passage for the insertion of a bolt 52 is provided by these bores, with the bolt 52 being inserted first through the bore 44 and then through the bores 46, 48 and 50 in order. A nut 54, containing threads completely therethrough, threadedly engages the end of bolt 52 and abuts the outer periphery of the bracket plate 34 by means of a face 56 formed on nut 54 (partially by the inner surface of its head) while an inner surface of head 58, formed on bolt 52, engages the sleeve portion 24. Thus, the sleeve portion 24 and bracket plate 34 tend to clampingly hold the lower handle portion 26 therebetween.

In order to insure the aforesaid positive clamping and the proper interengagement between the tabs 32, 32 and the grooves 42, 42 upon tightening of the nut 54 and bolt 52, the nut 54 includes a shank portion 60 which extends from the face 56 axially inwardly relative to the assemblage. The shank portion 60 is cylindrical and has a slightly smaller diameter than the head of the nut 54 and merges into a truncated conical shank section 62 which, at its inner end, is provided with a rim 64 that is generally perpendicular to the axis of nut 54. In order to accommodate the varying diameters of nut 54 bores 48 and 50 are of different diameters than bores 44 and 46. More specifically, bore 50 is of sufficient diameter to accommodate the diameter of shank portion 60 so that the same may be easily inserted therein. Bore 48 is of equal or slightly smaller diameter than the diameter of shank portion 60 so that shank portion 60 of bolt 52 tends to center itself relative to the bracket plate 34 and handle portion 26 to eliminate to a large degree the looseness experienced between them. Bores 44 and 46 are of equal diameter, but this diametric measurement is less than the extent of the diameter of bores 48 and 50, it being sufficient to size these diameters so that they are only slightly larger than the threaded diameter of bolt 52. Again, bolt 52, extending through smaller diameter bores 44 and 46, tends to center the parts and eliminate looseness when threadedly attached to nut 54.

The bottommost portion of bracket plate 34 includes an integral bent tab 66 which extends generally perpendicular to the remainder or a major portion 67 of bracket plate 34 and when assembled, parallel to the axis of bores 44, 46, 48 and 50 and centered below the bore 50. The bent tab 66 engages inanother bore 68 disposed below the bore 48 in lower handle portion 26, with this bore also extending parallel to the axis of bore 48 and centered below and relative to it. The bore 68 and bent tab 66 have been sized to be smaller than the diameter of bores 48, 50, with the bent tab only slightly smaller in dimension than the bore 68 to eliminate looseness therebetween. Th bore 58 and bent tab 66, however, could be dimensioned larger if desired as long as the dimension difference between them is maintained relatively small to eliminate looseness.

When the connection between the bail 14 and handle 12 is completely assembled, it can be easily seen that the principles of the invention have been fully carried out. The interengagement of bolt 52 with nut 54, with the bolt 52 extending through bores 44, 46, 48 and 50 and the nut 54 extending through bores 48, 50 provides a connecting means for the floor care appliance 10 that acts, positively, as a means for preventing all but minimal relative vertical movement between the handle 12 and bail 14. At the same time, the interengagement of the tabs 32, 32 on the sleeve portion 24 with the grooves 42, 42 on the bracket plate 34 primarily prevents rotation of handle 12, generally on its axis, relative to the bail 14 so that the tabs 32, 32 and grooves 42, 42 provide a means for prevention of the aforesaid rotation. In a similar manner, bent tab 66 engages in bore 68 to prevent sideways rocking or turning of said handle 12 relative to the bail 14 on the axis of the bolt 52.

It should be additionally noted that the fabrication of the parts involved is also very inexpensive. The bail 14 is normally a die casting so that the tabs 32, 32 are formed simultaneously during this operation. The bracket plate 34 is made by first blanking out the piece and then forming the various curvilinear sections, the tab, etc. in a progressive die. The inventive assemblage, thereby, is formed at a very low cost.

Many modifications could be made to the structure described and illustrated which would readily occur to one skilled in the art which would fall within the spirit of the description offered. For example: the bolt and nut could be reversed as to their insertion within a consequent readjustment of the diameters of the bores; the tabs and grooves could be reversely mounted as could the bent tab and its bore; and the various means limiting vertical, rotating and turning movement could have their functions provided by other or differing engaging structures.

I claim:

1. A handle and bail joint or the like comprising:
   a. a sleeve portion on said bail;
   b. passage means near a termination point of said handle;
   c. passage means in said sleeve portion coincident with said passage means of said handle;

d. a bracket means engageable with said termination portion of said handle, said bracket means also having passage means;
e. a retaining means passing through all said aperture means for retaining said bail and handle in assembled condition relative to vertical movement; and
f. passage means and tab means on said bracket means and said termination portion of said handle engaged for prevention of turning of said bail relative to said handle.

2. A handle and bail joint or the like comprising;
a. a sleeve portion on said bail;
b. passage means near a termination portion of said handle;
c. passage means in said sleeve portion coincident with said passage means of said handle;
d. a bracket means engageable with said termination portion of said handle, said bracket means also having passage means;
e. a retaining means passing through all said passage means for retaining said bail and handle in assembled condition relative to vertical movement;
f. groove and tab means on said bracket means and said sleeve portion engaged for prevention of rotation of said bail relative to said handle;
g. said bracket means and said termination portion of said handle including another passage means and another tab means spatially displaced from all said first mentioned passage means, and
h. said another tab means engaging said another passage means to prevent turning of said handle relative to said bail.

3. A handle and bail joint or the like comprising;
a. a sleeve portion on the bail providing a curvilinear surface conforming to a curvilinear part of a terminating portion of said handle;
b. bore means extending through said terminating portion of said handle substantially diametrically thereof;
c. bore means in said sleeve portion extending substantially diametrically therethrough and coincident with said bore means of said terminating portion of said handle;
d. a bracket means engageable with said terminating portion of said handle, said bracket means including a curvilinear surface conforming to said curvilinear part of said terminating portion of said handle, said bracket means also having a bore means extending substantially diametrically therethrough and coincident with said bore means in said sleeve portion;
e. a retaining means passing through all said bore means clampingly retaining said curvilinear surfaces of said sleeve portion of said bail and said bracket means against said curvilinear part of said terminating portion of said handle to thereby prevent relative vertical movement between said bail, handle and bracket means;
f. engaged groove and tab means on said bracket means and said sleeve portion of said bail means, said engaged groove and tab means extending transversely to said retaining means for preventing rotation of said bail relative to said handle, as clampingly held together by said retaining means, said rotation being generally around the longitudinal axis of said handle;
g. said curvilinear portion of said bracket means and said terminating portion of said handle including an aperture means and another tab means vertically displaced from said retaining means and said first mentioned engaged groove and tab means; and
h. said another tab means engaging in said aperture means with said curvilinear surface of said bracket means in conformance with said curvilinear part of said handle portion to thereby prevent turning of said handle relative to said bail around the axis of said retaining means.

* * * * *